P. BROADBOOKS.
Improvement in Pruning Shears.
No. 127,735.
Patented June 11, 1872.
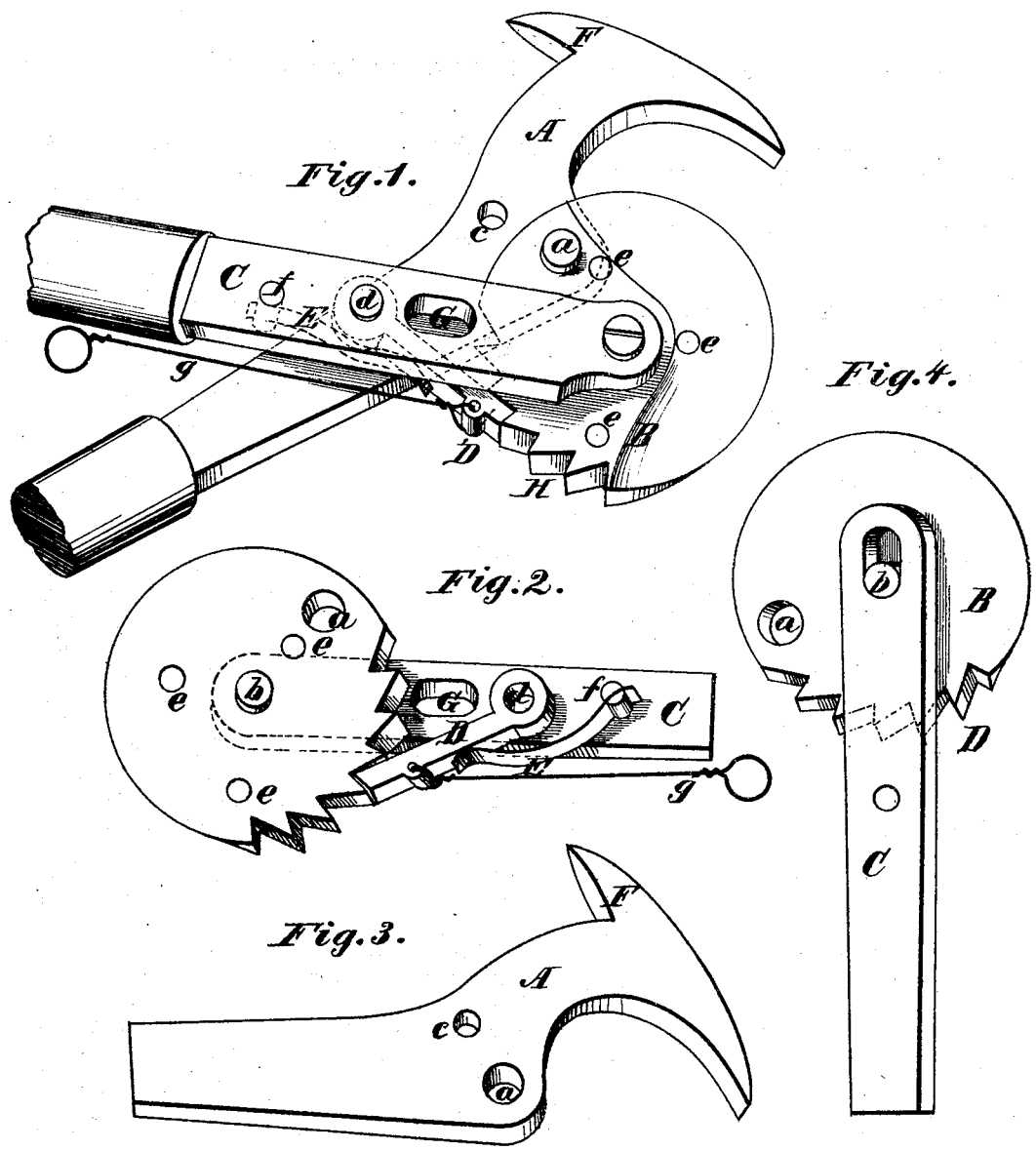
Witnesses:
Ambrose Stevens.
Ureden T. Bliss.
Inventor:
Peter Broadbooks.

UNITED STATES PATENT OFFICE.

PETER BROADBOOKS, OF BATAVIA, NEW YORK, ASSIGNOR OF ONE-HALF HIS RIGHT TO RODERICK F. THOMPSON, OF SAME PLACE.

IMPROVEMENT IN PRUNING-SHEARS.

Specification forming part of Letters Patent No. 127,735, dated June 11, 1872.

*To all whom it may concern:*

Be it known that I, PETER BROADBOOKS, of Batavia, in the county of Genesee and State of New York, have invented a new and useful Improvement in Pruning-Shears; and I do hereby declare that the following is a full, clear, and exact description thereof, which will enable others skilled in the art to make and use the same, reference being had to the accompanying drawing forming part of this specification, in which—

Figure 1 is a side view of my improved shears partially opened.

Fig. 2 is the side view of B and C, Fig. 1, reversed, exhibiting the ratchet H, dog D, and spring E.

Fig. 3 is a detached side view of the hook part of the shears, with pulling-hook F.

Fig. 4 is a detached side view of the wheel B with the lever C, and a stationary dog, D.

The object of this device is to obtain sufficient leverage power in the cutting-jaws, and work the shears without opening the handles but a short space, without regard to length of handles; also, to open the shears when the handles are close together.

A is a metallic hooked jaw, which is bolted or riveted to the ratchet-wheel blade at $a$, and revolves on said bolt or rivet. B is the ratchet-wheel blade, which is bolted or riveted to lever C at $b$. The wheel can be constructed in part of malleable iron and part cast-steel for the cutting-blade, or the whole of steel. C is a lever bolted or riveted to B at $b$, with a revolving motion. D is a dog attached to C at $d$ by bolt or rivet, which works in the ratchet H, and, in connection with the lever C, is used to force the cutting power. E is a spring fastened to the post $f$ to press the dog home to its place in ratchet. F is hook attached to A for pulling limbs. G is a mortise in lever C, to be used by introducing a bolt through the same at $c$, to be used with that fulcrum when the dog is thrown out of gear.

H is ratchet on one section of the edge of the cutting-wheel; $a$, bolt or rivet to connect A and B; $b$, to connect B and C; $c$, bolt to be used as fulcrum in connection with mortise G in lever C when dog D is thrown out of gear; $d$, in Fig. 4, dog, stationary on lever C, to be used by pressing lever upward, and to shift the position of the lever, draw the same down to clear the dog D from ratchet, which shifting is admitted by the mortise in lever at center of wheel. $e$ $e'$ $e''$, Figs. 1 and 2, are rivets or screws to fasten the cast-steel blade to the balance of the wheel in case it should be made of malleable iron or other metal. $f$ is a post to fasten the end of spring E. $g$ is a wire fastened to dog D, so as to draw it out of gear, and extending down to handles.

In operating my improved pruning-shears I throw the hook-jaw over the limb to be cut off; then, by a movement of the lever C, force the edge of the circular blade through the limb. I can use very long handles, as it is only necessary to move the knife far enough at each movement of the lever to allow the dog to drop into the next ratchet, and by two or three successive movements the work is accomplished. I also get the advantage of great leverage power, which enables me to sever large limbs with ease.

In the modification shown in Fig. 4 the dog is rigidly attached to the lever C, which has a slot in the end to slide on bolt $b$, so as to allow the disengagement of the dog.

Having thus described my invention, I claim—

In pruning-shears, a circular ratcheted blade pivoted to hook-jaw A, in combination with lever-handles C and dog D, substantially as described.

PETER BROADBOOKS.

Witnesses:
   JAS. M. MILLER,
   BENJAMIN B. C. PAGE.